Dec. 16, 1924.

W. A. SALISBURY

TURBINE ENGINE

Filed Oct. 6, 1919

INVENTOR
Wilbur A. Salisbury
BY L. L. Westfall
ATTORNEY

Dec. 16, 1924.

W. A. SALISBURY

TURBINE ENGINE

Filed Oct. 6, 1919

Inventor:
Wilbur A. Salisbury
By L. L. Westfall
Attorney

Patented Dec. 16, 1924.

1,519,336

UNITED STATES PATENT OFFICE.

WILBUR A. SALISBURY, OF SPOKANE, WASHINGTON, ASSIGNOR TO SALISBURY TURBINE MOTOR CO., OF SPOKANE, WASHINGTON, A CORPORATION.

TURBINE ENGINE.

Application filed October 6, 1919. Serial No. 328,649.

*To all whom it may concern:*

Be it known that I, WILBUR A. SALISBURY, a citizen of the United States of America, residing at Spokane, in the county of Spokane and State of Washington, have invented new and useful Improvements in Turbine Engines, of which the following is a specification.

This invention pertains to turbine engines and has for its object to provide a turbine engine adapted for general power use and particularly for automobiles, marine engines and aeroplanes. To so construct the same as to have a perfect balancing effect in action and to remove all unnecessary friction, vibration and noise. A further object is to provide a construction of the character mentioned that will be durable, simple in construction and economical in operation. Other and further objects will be hereinafter disclosed. I accomplish my purposes by the construction hereinafter particularly described and illustrated in the accompanying drawings, in which.

Figure 1:
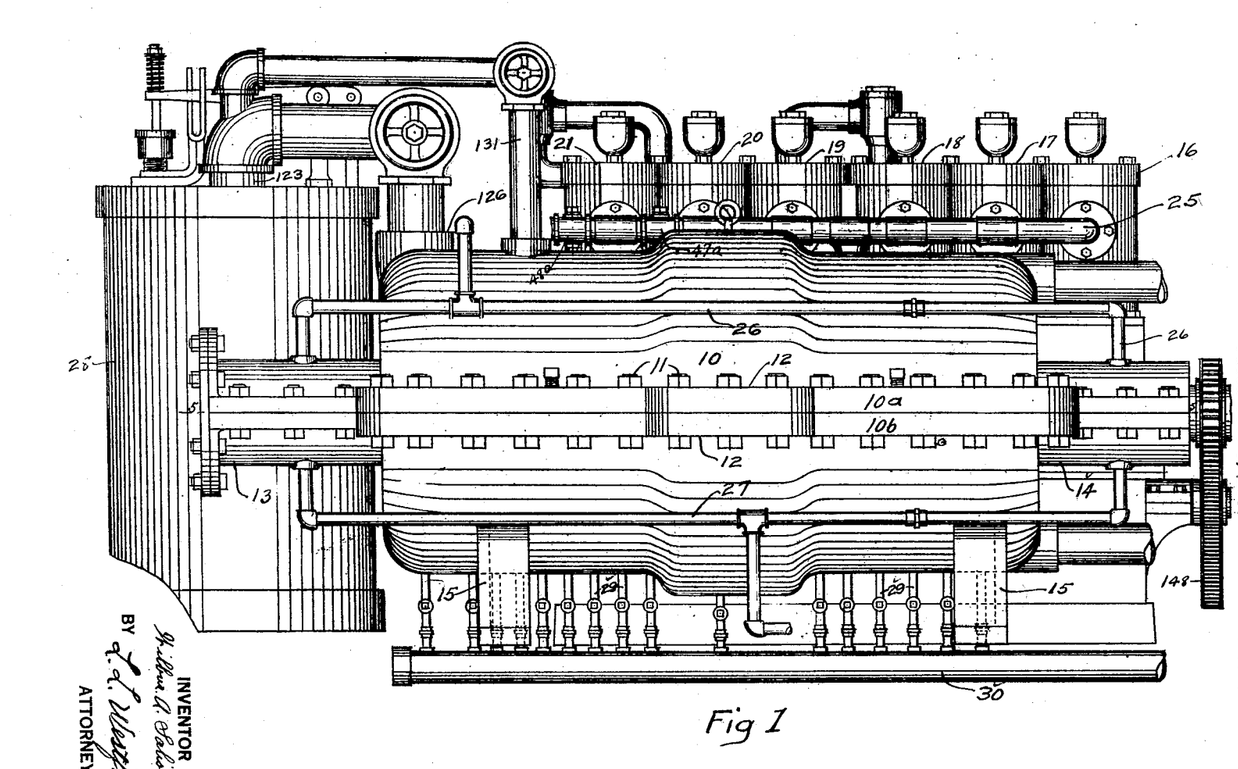
Figure 1 is a side elevation of the turbine, boiler and pumps, broken-away.

In a detail description in which like numerals refer to like parts throughout the several views, a casing 10, Figure 1, is composed of two half shells 10ᵃ and 10ᵇ, secured together by means of bolts 11 extending through the flanges 12. This casing encloses the rotor hereinafter described, and the extensions 13 and 14 support the bearings of the rotor. The casing 10 is shown mounted on legs 15.

Figure 2:
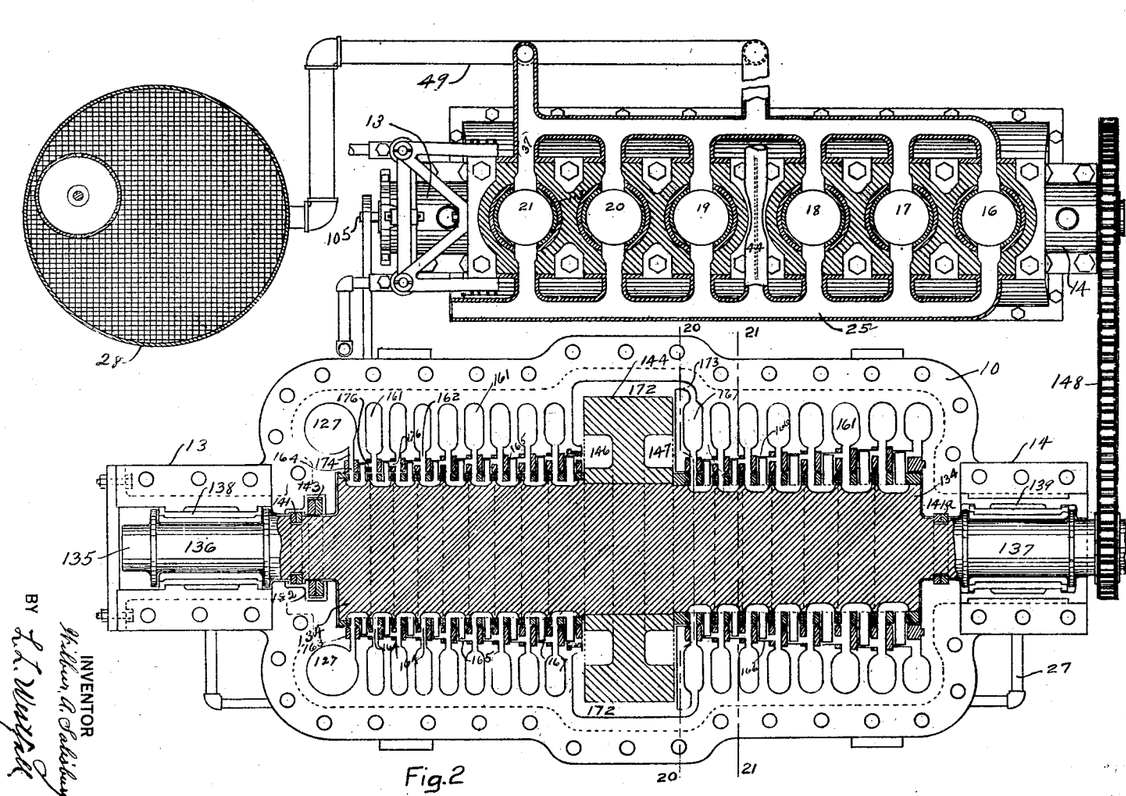
Figure 2 is a central longitudinal sectional view of Figure 1.
Figure 3:
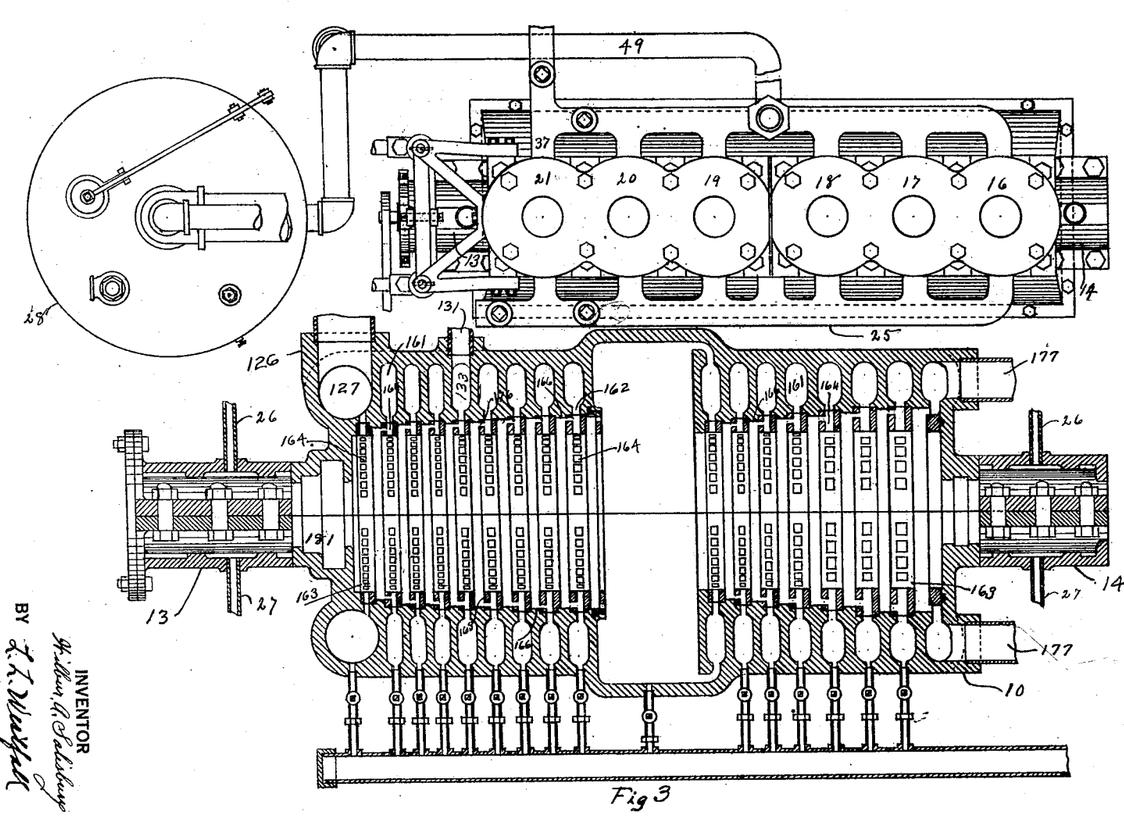
Figure 3 is a combined vertical sectional view of the rotor and a top plan view of some pumps and a boiler adapted for use in connection with the rotor.

Figures 1, 2 and 3 inclusive show the assembled mechanism of the engine and its connection with a boiler and feed pump, whereby the boiler is supplied. Intakes 126 and 131 from the boiler 28 lead to the ports 127 and 133 respectively, either one or both of which may be used. The cylinders 16 to 21 inclusive contain the pumps for pumping fuel to the boiler 28. External pipes 26 and 27 are for the purpose of supplying oil to bearings 138 and 139 in the casing extensions 13 and 14.

Figure 14:
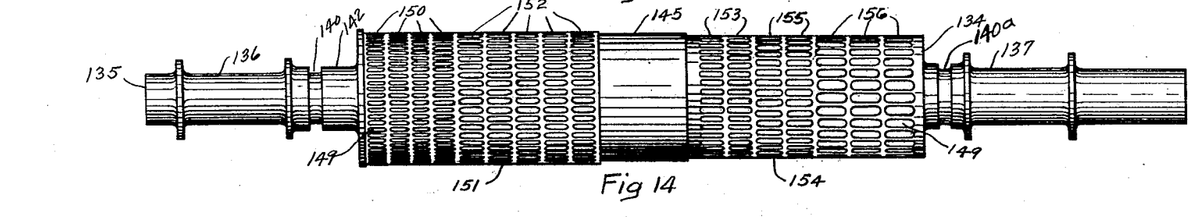
Figure 14 is an elevation of the rotor shaft, the rotor being stripped of the rings, blades and tube-blades.

The rotor proper, 134, Figure 14, occupies the casing 10, Figure 1, and has a shaft 135 with portions 136 and 137 having bearings 138 and 139, respectively, in the extensions 13 and 14, respectively, of the casing 10, Figure 2. The shaft 135 has two annular grooves 140 and 140ᵃ, one near each end of said shaft, in each of which is set a pair of brass rings 141. Mounted on the portion 142 of the shaft 135 is a pair of carbon molybdenite rings 143. Centrally disposed on the rotor 134 is a fly-wheel 144, Figures 2 and 4, the same occupying the space 145 on Figure 14. The said fly-wheel 144 has an annular port 146, the opposite side of the wheel being grooved out at 147 in order to balance the mechanism. The shafts 105 and 135 are connected by a chain drive 148. The body 134 of the rotor is milled out into longitudinal oblong slots 149, grouped in annular circles of different sizes. For instance, the first four annular groups 150, on the high pressure end 151 of the rotor, comprise slots, each of the width of six degrees of the circle. The next five annular groups 152 on the high pressure end comprise slots, each of the width of eight degrees of the circle.

Figures 4, 5, 6, 7, 8, 9, 10, 11, 12, 13:
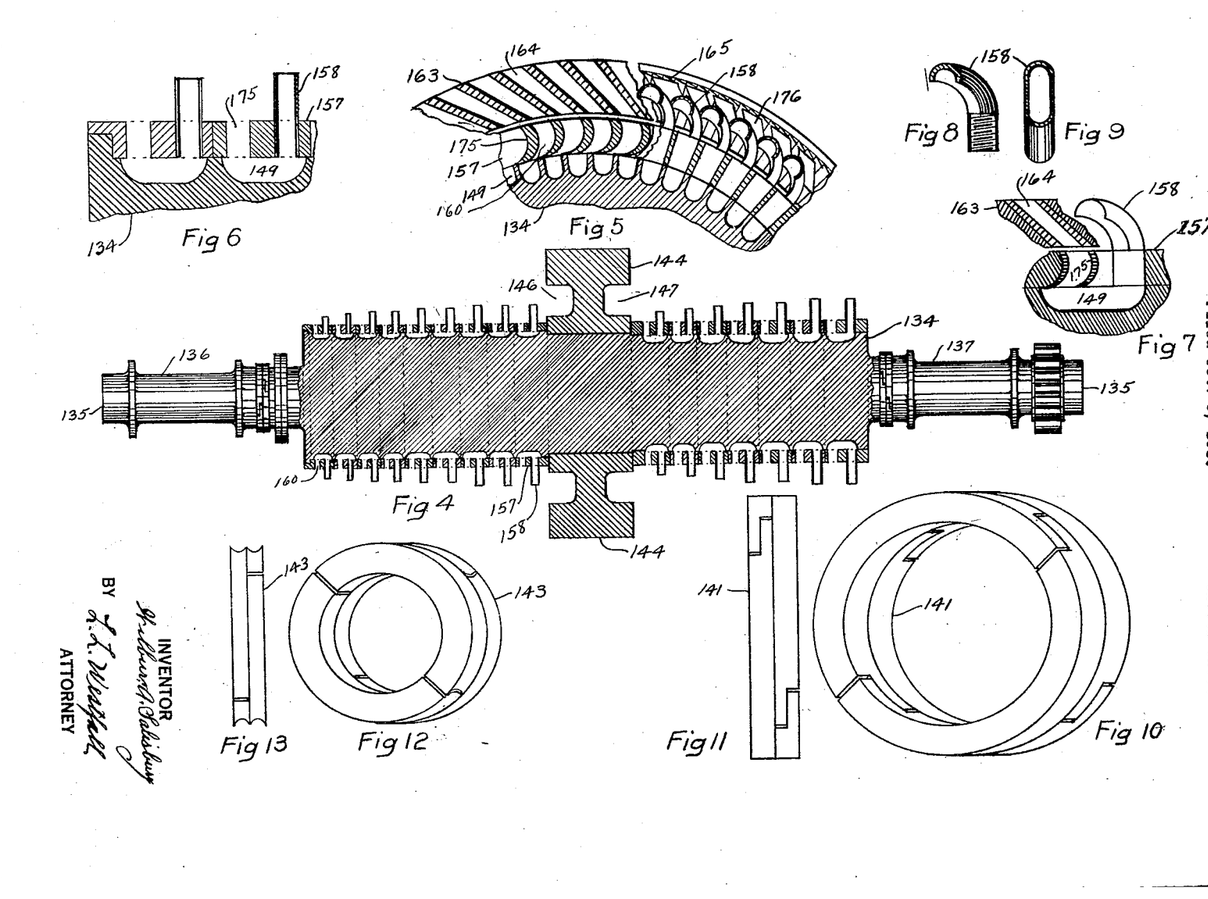
Figure 4 is a central longitudinal sectional view of the rotor, tube-blades, nozzles, showing the co-operative connection of the parts for conveying the steam through the nozzles onto the blades of the rotor and the means for conveying the vapors to the tube-blades of the rotor and against the corrugations and through the exhaust ports.
Figure 5 is a sectional view of the rotor construction, and will be hereinafter referred to for the purpose of describing the co-operative relations of the parts shown.
Figure 6 is a fragmental sectional view of the rotor illustrating the mechanism of the passages and blades.
Figure 7 is an enlarged fragmental view taken from Figure 5, illustrating the construction of one single nozzle.
Figure 8 is an elevation of a single tube detached after being bent to position.
Figure 9 is an elevation of the same before being bent to position.
Figure 10 is a side elevation of a pair of brass rings, each being formed of two portions with lap joints.
Figure 11 is an edge view of the same, said rings engaging the shaft of the rotor at both ends thereof to prevent vapors from escaping from the rotor.
Figure 12 is a side elevation of a pair of carbon rings, each made of two parts joined together and placed on the shaft of the rotor at the high pressure end thereof between the rotor and the brass rings for the purpose of further preventing the hot vapors from escaping from the rotor.
Figure 13 is an edge view of the same.
Figure 15:
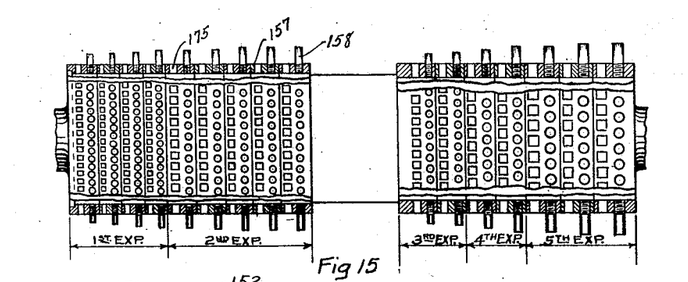
Figure 15 is a broken-away view of Figure 14, with the rings, blades and tube-blades in place.
Figure 16:
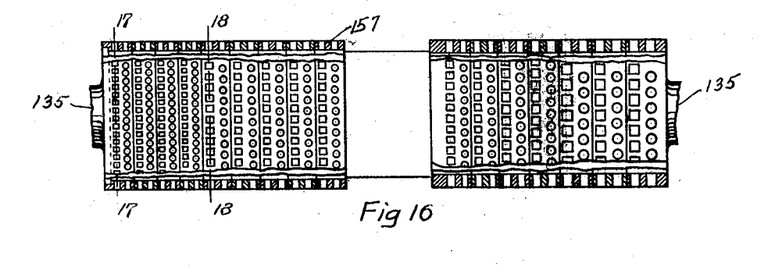
Figure 16 is a broken-away view of Figure 14, with the square blades in place and the openings for the insertion of the tube blades.
Figures 17, 18:
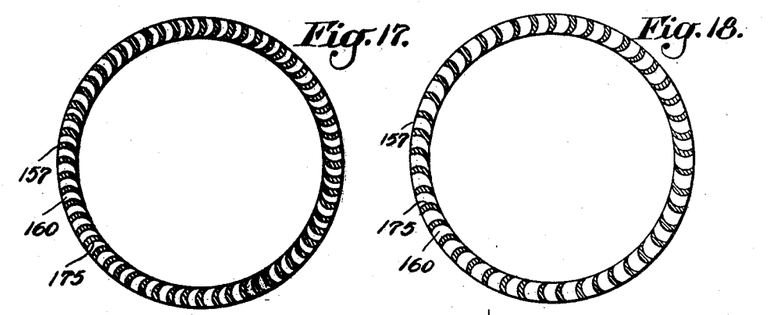
Figure 17 is a detail side view of the ring and blades of the first expansion of the high pressure side of the rotor, occupying a position on the line 17—17 of Figure 16.
Figure 18 is a like view of rings and blades of the second expansion of the high pressure side, occupying a location on the line 18—18 of Figure 16.

The first two annular groups 153, on the low pressure side 154, comprise slots, each of the width of eight degrees of the circle. The next two annular groups 155, on the low pressure side, comprise slots, each of the width of ten degrees of the circle, and the last three annular groups 156 comprise slots each of the width of twelve degrees of the circle. These different sizes of slots 149 are grouped for and indicated as first, second, third, fourth and fifth expansions as shown in Figure 15. Inserted over these groups of slots 149 are power-expansion blade rings 157, shown on Figure 16 without and before the blades 158, Figure 15, are inserted therein. In Figure 4 is shown, generally, the assembled relationship of the rotor body 134, the rings 157 and the blades 158. The rings 157 have vanes 175 between the openings 160, differing in their spaced relation to each other to correspond with the width of the milled openings 149 in the body of the rotor. For instance, Figure 17 shows one of the rings 157 drawn to one-half of the actual size of the rings for the designed rotor adapted for the slots 150, Figure 14, or for the first expansion. Figure 18 applies in the same manner to the slots 152 of the second expansion.

Figure 19:
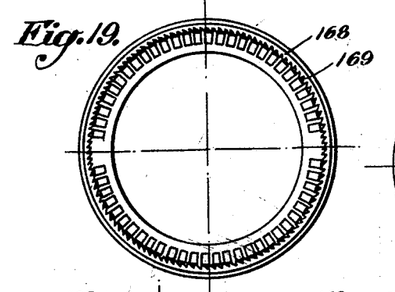
Figure 19 is a side elevation of one of the exhaust ports rings.

The casing has milled out annular pockets 161, Figures 2 and 3, such pockets being narrowed down at their inner ends to a narrow entrance 162, where they connect with rings 163 differently illustrated in Figures 22 to 26 inclusive. The rings 163, Figures 22 to 26, have nozzles 164 corresponding with the entrance 162 of the pockets 161 in the casing. On both sides of these rings are corrugations 165, excepting the rings at the ends of the rotor, which have corrugations on one side only. The lower half of Figures 22, 23, 24 and 25, show sectional views of the rings and the upper half thereof, a side elevation. In the assembling of the parts, the rings 157 are placed as shown in Figure 15, those marked "1st Exp." being placed over the slots 150 of the rotor body 134, Figure 14; those marked "2nd Exp.", over the slots 152; those marked "3d Exp.", over the slots 153; those marked "4th Exp.", over the slots 155, and those marked "5th Exp." over the slots 156. The rings 163 are assembled in the casing 10 with the nozzles 164 corresponding with the entrances 162 of the pockets 161 of the casing 10 and with the ports 165 of the rings 157. The inner surfaces 166 of the casing 10 between the pockets 162, are corrugated as at 167, Figure 21. The rings shown at Figures 22 to 25, inclusive, are placed between the rings 157 and the casing 10 according to relative sizes thereof, the rings shown in Figure 22 being placed over the rings of the first expansion, the rings shown in Figure 23 being placed over the rings of the second expansion, the rings shown in Figure 24 being placed over the rings of the third expansion, the rings shown in Figure 25 being placed over the rings of the fourth expansion, and the rings shown at Figure 26 being placed over the rings of the fifth expansion, Figures 14 and 15. A specially designed nozzle ring 168, Figure 19, is placed at the inner end of the first expansion, the same having peripheral corrugations 169.

Figure 20:
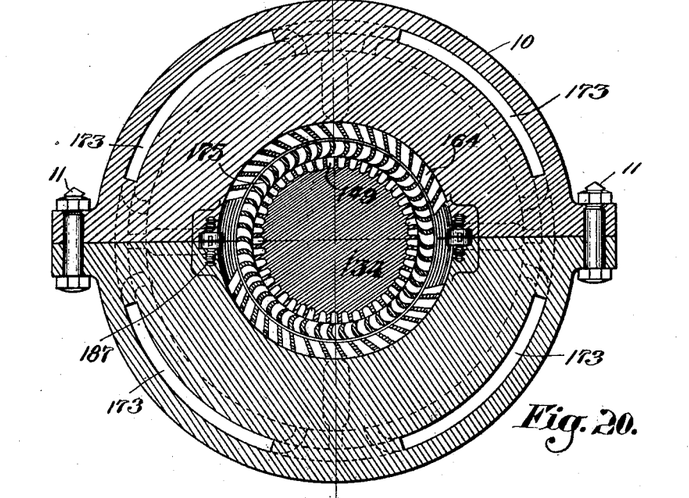
Figure 20 is an enlarged transverse sectional view taken on the line 20—20 of Figure 2.
Figure 21:
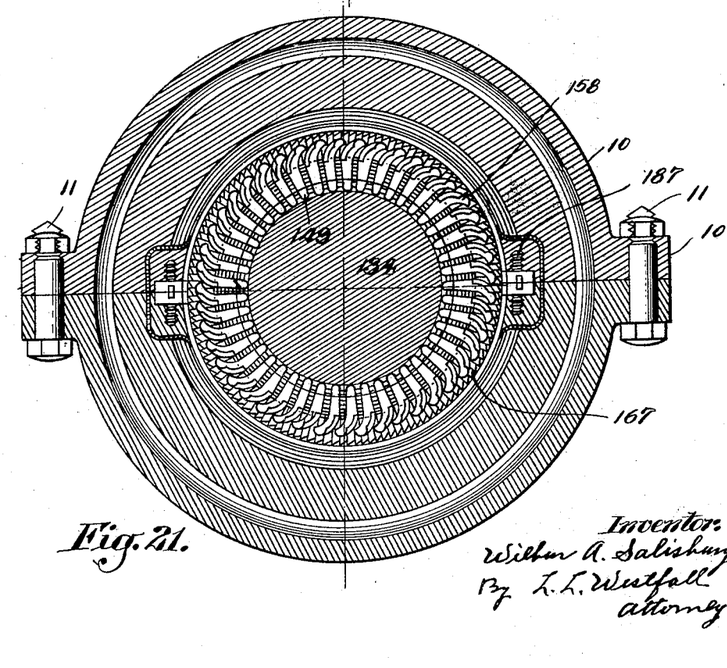
Figure 21 is an enlarged transverse sectional view taken on the line 21—21 of Figure 2.
Figure 22:
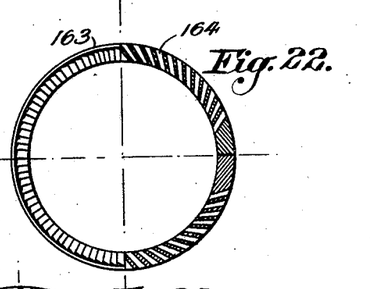
Figures 22 to 25 are diagrammatic views of the nozzle rings of the first to fourth expansion, respectively, showing one-half circle of the corrugation and one-half circle of the nozzles, such ring, when in place, being attached to the shell of the rotor.
Figures 23, 24, 25, 26, 27, 28:
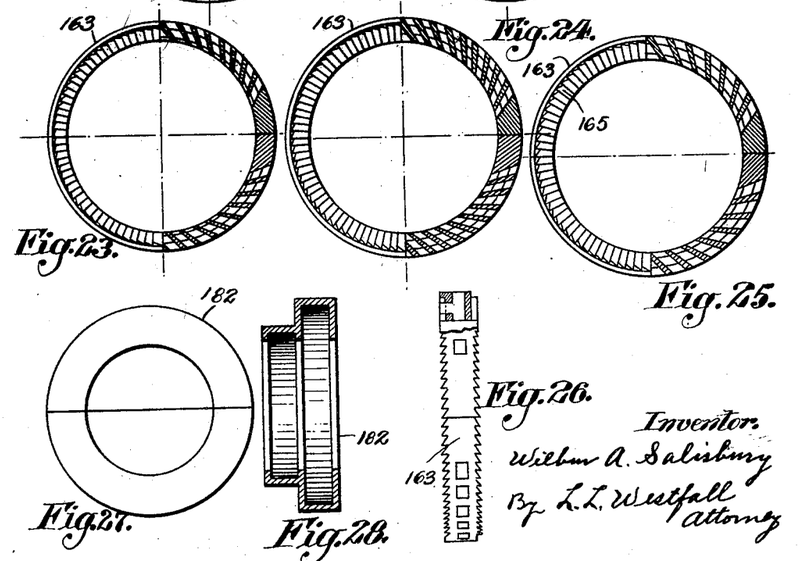
Figure 26 is an edge view of the nozzle ring shown in Figure 27.
Figure 27 is a side elevation of a casing for the rings shown in Figures 10 to 13 inclusive.
Figure 28 is a sectional view of Figure 27.

From the exhaust of the ring 168, the pressure fluid expands into the annular port 146 of the fly-wheel 144, Figure 2, from whence it passes through the opening 172 around the fly-wheel 144 to and through a port 173 and from thence to and through the first pocket 161 on the low pressure side of the rotor. The action of the pressure fluid from the time it enters through the main intake 126 of the rotor to the intake port 127 is as follows: From the port 127 the pressure fluid enters an annular port 174, Figure 2, from whence it passes to and through the nozzle 164 of the first ring 163, Figures 5 and 7, thence to and through the port 165 of the first ring 157, driving against the crescent surface of the vanes 175, thence passing to and through the slots 49 of the rotor body 134, thence upwardly to and against the curved blades 158, thence exhausting through the ports 176 into the first pocket 161, Figure 2, from whence the same enters the nozzle 164 of the next ring 163 and repeats the operation until the sixteen rings of the high and low pressure sides of the rotor are all passed, and finally exhausts from the last pocket 161 through the exhaust pipes 177, finally passing away through the pipe 178. The expansion of the pressure fluid against the corrugations 165 of the rings 163 and against the corrugations 167 on the inner surface 166 of the casing 10 gives added impulse to the rotor. The general idea of the rotor is, making the proper provision for expansion, properly distributing the same, and appropriating the impulses therefrom to obtain the maximum power. The centrally disposed fly-wheel 144, Figures 2 and 4, is for balancing the rotor and for general purposes, as well as to give the gyroscope effect when developed up to a high rate of speed. Only the port 146 in the fly-wheel 144 is used, the hollowing out at 147 on the opposite side of the wheel is only for balancing purposes. The casing 182 shown in Figures 27 and 28 is mounted in the space 181, Figure 3, and encloses the rings 141 and 143 at that end of the rotor. Referring again to Figure 1, stop cocks 47ª and 48ª are installed in the process of feeding the pressure fluid to the rotor. Referring to Figures 20 and 21, the nozzle rings 162 are held in place by keeper screws 187. Tubes 29 Figure 1, connected with a common waste pipe 30, are for the purpose of draining off the condensation from the ports.

What is claimed is:

1. A turbine engine having a rotor divided into high and low pressure sides, with a fly-wheel between the two and an annular port in the side of the fly-wheel, for the passage of pressure fluid from the high to the low pressure side.

2. A turbine engine having a rotor divided into high and low pressure sides, with a fly-wheel between the two and an annular port in the side of the fly-wheel for the passage of pressure fluid from the high to the low pressure side, the said fly-wheel being centrally disposed.

3. A turbine engine having a rotor with rows of disconnected hollowed out portions on its periphery and annular members extending over such hollowed out portions, said annular members having a series of entrance openings therethrough connected with said hollowed out portions and a series of exhaust openings connected with said hollowed out portions and outwardly extending blades connected with said exhaust openings, said entrance openings having curved walls or vanes, and such blades being curved longitudinally and in cross section, combined with a casing having an entrance port, in which casing said rotor is mounted, said casing carrying internal annular members having nozzles, the nozzles of one annular member of which are connected with said exhaust port, said members outwardly engaging the annular members on the rotor with the nozzles in the former annular members engaging the entrance ports of the latter.

4. A turbine engine having a rotor mounted in a casing, an entrance port to said casing, a series of annular disconnected expansion pockets in the inner wall of said casing, a series of annular members engaging the inner wall of said casing, said annular members having peripheral ports connected with said pockets and lateral exhaust ports connected therewith, the pockets in the casing being enlarged in size beyond the size of the fluid passages connected therewith, for expansion purposes.

5. A turbine engine having a rotor mounted in a casing, an entrance port to said casing, a series of annular disconnected pockets in the inner wall of said casing, a series of annular members engaging the inner wall of said casing, said annular members having peripheral ports connected with said pockets and lateral exhaust ports connected therewith, said annular rings having serrated edges.

6. A turbine engine having a rotor mounted in a casing, an entrance port to said casing, a series of annular disconnected pockets in the inner wall of said casing, a series of annular members engaging the inner wall of said casing, said annular members having peripheral ports connected with said pockets and lateral exhaust ports connected therewith, and a series of annular members on said rotor having exhaust blades connected with the exhaust pipes in the annular members on the casing, as a means of connection with the pockets in the casing.

In testimony whereof, I affix my signature in presence of two witnesses.

WILBUR A. SALISBURY.

Witnesses:
L. L. WESTFALL,
JOSEPH MCCARTHY.